United States Patent [19]

Chen et al.

[11] Patent Number: 5,039,394
[45] Date of Patent: Aug. 13, 1991

[54] INTEGRATED COKING-GASIFICATION PROCESS WITH MITIGATION OF SLAGGING

[75] Inventors: Tan-Jen Chen, Clearwater, Canada; Lloyd A. Pine, Baton Rouge, La.

[73] Assignee: Exxon Research and Engineering Company, Florham Park, N.J.

[21] Appl. No.: 591,336

[22] Filed: Dec. 10, 1990

[51] Int. Cl.$^5$ ............................ C10J 3/08; C10G 9/32
[52] U.S. Cl. .................... 208/127; 48/197 R; 208/125; 208/126
[58] Field of Search ...................... 208/197; 48/197 R

[56] References Cited

U.S. PATENT DOCUMENTS

| | | | |
|---|---|---|---|
| 3,702,516 | 11/1972 | Luckenbach | 208/127 |
| 3,816,084 | 6/1974 | Moser, Jr. et al. | 208/127 |
| 4,169,038 | 9/1979 | Metrailer et al. | 208/127 |
| 4,203,759 | 5/1980 | Metrailer et al. | 423/62 |
| 4,213,848 | 7/1980 | Saxton | 208/127 |
| 4,269,696 | 5/1981 | Metrailer et al. | 208/127 |
| 4,297,202 | 10/1981 | Blaser | 208/127 |
| 4,511,371 | 4/1985 | Blaskouski | 48/197 R |
| 4,642,175 | 2/1987 | Rudnick | 208/48 AA |
| 4,705,536 | 11/1987 | Becker et al. | 208/127 |
| 4,867,756 | 9/1989 | Patel | 48/197 R |

Primary Examiner—Helane E. Myers
Attorney, Agent, or Firm—Henry E. Naylor

[57] ABSTRACT

A fluid coking-gasification process for converting heavy hydrocarbonaceous chargestocks to lower boiling products in which a zeolitic material is use to mitigate slagging in the gasifier, especially when the zeolite material is spent catalytic cracking catalyst. The zeolite material is added either directly into the gasifier on it is mixed with the coke passing from the heating zone to the gasification zone.

16 Claims, 3 Drawing Sheets

INTEGRATED COKING-GASIFICATION PROCESS WITH MITIGATION OF SLAGGING

FIELD OF THE INVENTION

The present invention relates to an improved integrated fluid coking-gasification process wherein a zeolitic material, especially a spent zeolite cracking catalyst, is used to mitigate slagging in the gasifier.

BACKGROUND OF THE INVENTION

Much work has been done over the years to convert heavy hydrocarbonaceous materials to more valuable lighter boiling products. One such process is an integrated fluid coking-gasification process in which a heavy hydrocarbonaceous chargestock is fed to a coking zone comprised of a fluidized bed of hot solid particles, usually coke particles, sometimes referred to as seed coke. The heavy hydrocarbonaceous material is reacted in the coking zone resulting in conversion products which include a vapor fraction and coke. The coke is deposited on the surface of the seed particles. A portion of the coked-seed particles is sent to a heater which is maintained at a temperature higher than that of the coking zone where some of the coke is burned off. Hot seed particles from the heater are returned to the coking zone as regenerated seed material which serves as the primary heat source for the coking zone. Coke from the heating zone is circulated to and from a gasification zone which is maintained at a temperature greater than the heating zone. In the gasifier, substantially all of the coke which was laid-down on the seed material in the coking zone, and which was not already burned-off in the heating zone, is burned, or gasified, off. Some U.S. patents which teach an integrated fluid coking-gasification process are U.S. Pat. Nos. 3,726,791; 4,203,759; 4,213,848; and 4,269,696; all of which are incorporated herein by reference.

Myriad process modifications have been made over the years in fluid coking in an attempt to achieve higher liquid yields. For example, U.S. Pat. No. 4,378,288 discloses a method for increasing coker distillate yield in a thermal coking process by adding small amounts of a free radical inhibitor.

Also, U.S. Pat. No. 4,642,175 discloses a method for reducing the coking tendency of heavy hydrocarbon feedstocks in a non-hydrogenative catalytic cracking process by treating the feedstock with a free radical-removing catalyst so as to reduce the free radical concentration of the feedstock.

A problem which is being increasingly encountered is slagging in the gasifier of an integrated fluid coking-gasification commercial unit. Slagging is a complex phenomenon which is influenced by many factors and which can be a cause of major operability problems. For example, the formation of significant amounts of slag can cause blockage of the grid assembly in the gasifier. The grid assembly is comprised of inlet pipes for the introduction of steam and the oxygen-containing gas, and it is located at the bottom of the gasifier. Blockage of this grid assembly will increase the pressure and have an adverse effect on the flow distribution in the bed. If the blockage becomes excessive, design gasification rates may not be achievable and/or run lengths may have to be reduced. Slags can also corrode the cap materials of the grid assembly and form even larger slag accumulations. It is believed that the presence and build-up of vanadium salts in the gasifier are the chief cause of slagging. Consequently, there exist a need in the art for ways to mitigate slagging problems.

SUMMARY OF THE INVENTION

In accordance with the present invention, there is provided an improved integrated fluid coking-gasification process for converting heavy hydrocarbonaceous materials to lower boiling products. The process comprises:

(a) introducing a heavy hydrocarbonaceous chargestock into a coking zone comprised of a bed of fluidized solids maintained at fluid coking conditions, including a temperature from about 850° to 1200° F. and a total pressure of up to about 150 psig, to produce a vapor phase product including normally liquid hydrocarbons, and coke, the coke depositing on the fluidized solids;

(b) introducing a portion of said solids, with coke deposited thereon into a heating zone comprised of a fluidized bed of solid particles and operated at a temperature greater than said coking zone; and (c) recycling a portion of said heated solids from said heating zone to said coking zone;

(d) introducing a second portion of said heated solids from the heating zone to a gasification zone comprised of a fluidized bed of solid particles and maintained at a temperature greater than said heating zone; and (e) reacting said second portion of heated solids in said gasification zone with steam and an oxygen-containing gas;

wherein an effective amount of a zeolitic material is used to prevent slagging of the gasifier by: (i) adding it at the bottom of the gasifier of the gasification zone; or (ii) mixing it with the portion of heated solids passing from the heating zone to the gasification zone.

In a preferred embodiment of the present invention about 1 to 20 wt. % of the zeolitic material is used based on the total weight of chargestock and the zeolitic material, and is mixed with the heavy hydrocarbonaceous chargestock prior to introduction into the coking zone.

In another preferred embodiment of the present invention, the zeolitic material is added at the bottom of the gasifier.

In still other preferred embodiments of the present invention zeolitic material is a spent cracking catalyst containing a faujasite type of zeolite.

DETAILED DESCRIPTION OF THE INVENTION

Any heavy hydrocarbonaceous material typically used in a coking process can be used herein. Generally, the heavy hydrocarbonaceous material will have a Conradson carbon residue of about 10 t 40 wt. % and be comprised of moieties, the majority of which boil above about 975° F. Suitable hydrocarbonaceous materials include heavy and reduced petroleum crudes, petroleum atmospheric distillation bottoms, petroleum vacuum distillation bottoms, pitch, asphalt, bitumen, liquid products derived from coal liquefaction processes, including coal liquefaction bottoms, and mixtures thereof.

A typical heavy hydrocarbonaceous chargestock suitable for the practice of the present invention will have a composition and properties within the ranges set forth below.

| Conradson Carbon | 5 to 40 wt. % |
|---|---|
| Sulfur | 1.5 to 8 wt. % |
| Hydrogen | 9 to 11 wt. % |
| Nitrogen | 0.2 to 2 wt. % |
| Carbon | 80 to 86 wt. % |
| Metals | 1 to 2000 wppm |
| Boiling Point | 340° C.+ to 650° C.+ |
| Specific Gravity | −10 to 35° API |

Figure 1:
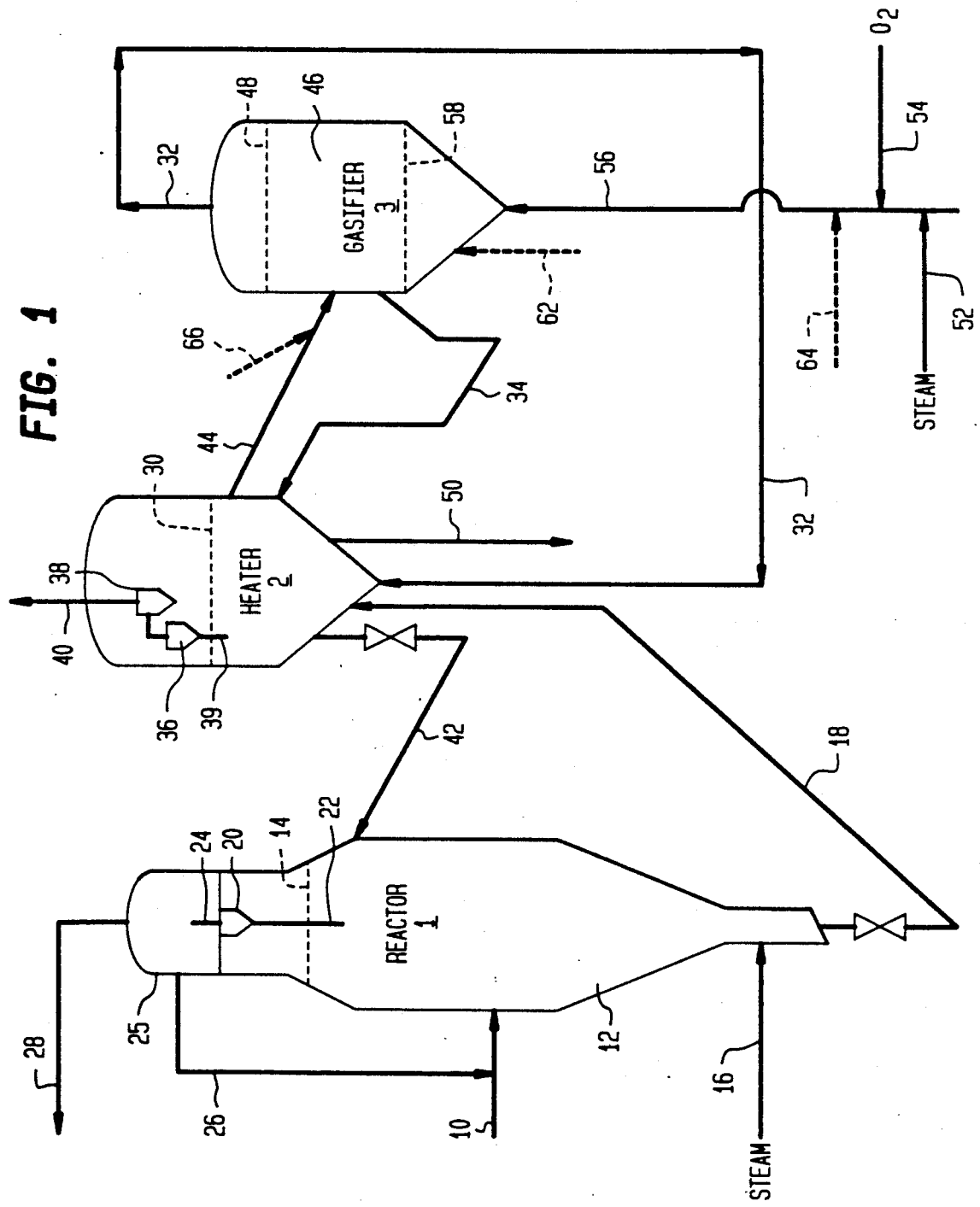
FIG. 1 is a schematic flow plan of one embodiment of the present invention for practicing an integrated coking/gasification process showing points where the zeolitic material can be introduced into the unit.

With reference now to FIG. 1 hereof, which shows an integrated fluid coking/gasification unit where most of the coke is gasified with a mixture of steam and air. The reaction vessel used for fluid coking is similar to those used for an integrated coking/gasification process. In the figure, a heavy hydrocarbonaceous chargestock is passed by line 10 into coking zone 12 in which is maintained a fluidized bed of solids having an upper level indicated at 14. Although it is preferred that the solids, or seed material, be coke particles, they may also be other refractory materials such as those selected from the group consisting of silica, alumina, zirconia, magnesia, alumdum or mullite, synthetically prepared or naturally occurring material such as pumice, clay, kieselguhr, diatomaceous earth, bauxite, and the like. The solids will have an average particle size of about 40 to 1000 microns, preferably from about 40 to 400 microns.

A fluidizing gas e.g. steam, is admitted at the base of coker reactor 1, through line 16, in an amount sufficient to obtained superficial fluidizing velocity in the range of about 0.5 to 5 ft/sec. Coke at a temperature above the coking temperature, for example, at a temperature from about 100° to 400° F., preferably about 150° to 350° F., and more preferably from about 150° to 250° F., in excess of the actual operating temperature of the coking zone is admitted to reactor 1 by line 42 in an amount sufficient to maintain the coking temperature in the range of about 850° to 1200° F. The pressure in the coking zone is maintained in the range of about 0 to 150 psig, preferably in the range of about 5 to 45 psig. The lower portion of the coking reactor serves as a stripping zone to remove occluded hydrocarbons from the coke. A stream of coke is withdrawn from the stripping zone by line 18 and circulated to heater 2. Conversion products are passed through cyclone 20 to remove entrained solids which returned to coking zone through dipleg 22. The vapors leave the cyclone through line 24, and pass into a scrubber 25 mounted on the coking reactor. If desired, a stream of heavy materials condensed in the scrubber may be recycled to the coking reactor via line 26. The coker conversion products are removed from the scrubber 25 via line 28 for fractionation in a conventional manner. In heater 2, stripped coke from coking reactor 1 (cold coke) is introduced by line 18 to a fluid bed of hot coke having an upper level indicated at 30.

The bed is partially heated by passing a fuel gas into the heater by line 32. Supplementary heat is supplied to the heater by coke circulating from gasifier 3 through line 34. The gaseous effluent of the heater, including entrained solids, passes through a cyclone which may be a first cyclone 36 and a second cyclone 38 wherein the separation of the larger entrained solids occur. The separated larger solids are returned to the heater bed via the respective cyclone diplegs 39. The heated gaseous effluent which contains entrained solids is removed from heater 2 via line 40.

A portion of hot coke is removed from the fluidized bed in heater 2 and recycled to coking reactor by line 42 to supply heat thereto. Another portion of coke is removed from heater 2 and passed by line 44 to a gasification zone 46 in gasifier 3 in which is maintained a bed of fluidized coke having a level indicated at 48. If desired, a purged stream of coke may be removed from heater 2 by line 50.

The gasification zone is maintained at a temperature ranging from about 1600° to 2000° F. at a pressure ranging from about 0 to 150 psig, preferably at a pressure ranging from about 25 to about 45 psig. Steam by line 52, and a molecular oxygen-containing gas, such as air, commercial oxygen, or air enriched with oxygen by line 54 pass via line 56 into gasifier 3. The reaction of the coke particles in the gasification zone with the steam and the oxygen-containing gas produces a hydrogen and carbon monoxide-containing fuel gas. The gasified product gas, which may further contain some entrained solids, is removed overhead from gasifier 3 by line 32 and introduced into heater 2 to provide a portion of the required heat as previously described.

There is a grid assembly 58 at the bottom of the gasifier which is comprised of inlet pipes for the introduction of steam and the oxygen-containing gas. During normal operation of the gasifier, slag deposits on the grid assembly, which corrodes the grid cap materials and in turn forms larger slag accumulations. The plugged grid caps reduce the available open area and consequently increase grid pressure drop and affects the flow distribution in the bed. If the amount of grid cap plugging, becomes excessive, design gasification rates may not be achievable and/or run lengths may have to be reduced. The vanadium in the coke is considered the contaminant most likely to promote slag formation. For example, vanadium pentoxide has a low melting point relative to the operating temperature of commercial gasifiers. Sodium is another likely contaminant; however, its concentration in gasifier coke is generally low compared to vanadium.

Zeolitic materials, which are suitable for mitigating slagging in accordance with the present invention are any of the conventional zeolitic materials conventionally used as cracking catalysts. Non-limiting examples of such zeolitic materials include the faujasites, such as zeolite Y, ultrastable zeolite Y, zeolite X, rare earth zeolite Y, alkaline-earth zeolite Y, NaY, and dealuminated zeolites, such as LZY-210. The term, faujasite type zeolites, is sometimes used herein and means zeolites which are isostructural with faujasite. Also suitable for use herein are zeolite L, zeolite A, mordenite, and silicalite. Preferred are the faujasite type of zeolites, especially zeolite Y, with and without rare earth exchange. The zeolitic material can be introduced into the gasifier in several ways. For example, it can be added as fines and blown in with air through a separate line 62 at the bottom of the gasifier. It can also be introduced via line 64 at the bottom of the gasifier with the steam and oxygen-containing gas via line 56. It can also be introduced via line 66 into line 44 where it is mixed with the portion of heater coke passing to the gasifier. Preferred is when it is introduced at the bottom of the gasifier. This technique has the advantage in that the zeolitic material, even when added intermittently, provides some scouring action which may physically reduce slag formation on the gasifier grid caps.

The amount of zeolitic material used in the practice of the present invention will be from about 0.1 to 20 wt. %, preferably from about 1 to 7 wt. %, and more preferably from about 2 to 5 wt. %, based on the total weight of coke and zeolitic material.

Having thus described the present invention, and a preferred and most referred embodiment thereof, it is believed that the same will become even more apparent by reference to the following examples. It will be appreciated, however, that the examples are presented for illustrative purposes and should not be construed as limiting the invention.

EXAMPLE 1

A static bed test was performed by placing 3.75 g. of each of two spent zeolitic materials, and 30 g. of heater coke from a commercial integrated fluid coker/gasifier, unit in a Coors (alumina) evaporating dish. The dish was then placed in a 12 inch Lindberg muffle furnace. One of the spent zeolite materials was a USY zeolite and the other was a rare earth exchanged zeolite Y (RE/USY), both from commercial catalytic cracking units. In another dish, only 30 g. of heater coke was used for comparison purposes. The heater coke had the following properties:

| | |
|---|---|
| Surface Area, m$^2$/g | 9.1 |
| Pore Volume, cc/g | 0.009 |
| Density—App. Bulk, g/cc | 0.82 |
| Attrition, Davison Index | 1 |
| Ash, wt. % | 3.16 |
| Sulfur, wt. % | 2.25 |
| V, wt. % | 1.49 |
| Na, wppm | 637 |
| Ni, wppm | 2988 |

The two zeolite materials used in this example had the following properties:

| | RE/USY | USY |
|---|---|---|
| Surface Area, m$^2$.g | 130.9 | 107.7 |
| Pore Vol. cc/g | 0.20 | 0.19 |
| Density—Apparent Bulk, g.cc | 0.85 | NA |
| Attrition, DI | 2 | 6 |
| Unit Cell Size, Angstroms | 24.31 | 24.25 |
| Crystallinity, % | 216 | 332 |

The samples were purged with air and the furnace was heated at a rate of 9° F./min. to a final temperature of 1750° F., which was held there for four hours to ensure complete combustion/gasification. Two types of materials were left in the dishes, a hard slag material and a soft non-slag material. The amounts of each are shown in Table I below. The soft non-slag material was powdery and was easily poured from the dish. The hard slag material strongly adhered to the dish. This hard material is representative of the slag material in commercial gasifiers.

TABLE I

| Zeolite Additive | Additive g. | Hard Deposit g. | Soft Deposit g. | % Reduction Hard Deposit |
|---|---|---|---|---|
| None | 0.00 | 0.54 | 0.55 | — |
| USY | 3.75 | 0.02 | 4.85 | 96 |
| RE/USY | 3.75 | 0.07 | 4.72 | 87 |

The above table illustrates the effectiveness of the zeolitic materials of the present invention for controlling slag formation.

EXAMPLE 2

Figure 2:
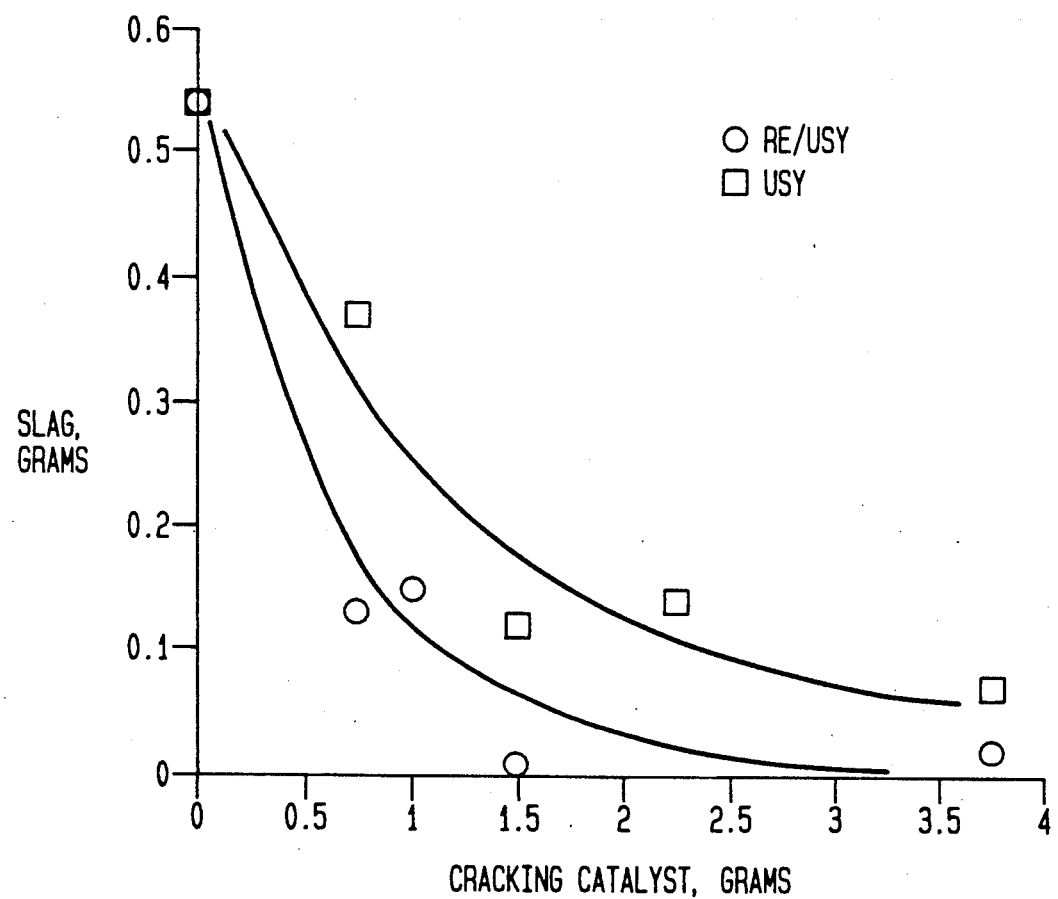
FIG. 2 is a graphical representation of slag reduction versus the concentration of spent zeolite cracking catalysts USY and rare earth exchanged USY, which are representative of the zeolitic materials of the present invention. This figure is a plot of the data obtained in example 2 hereof.

This example was conducted in accordance with the procedure of Example 1 hereof and with the two spent zeolite cracking catalysts used therein to show the effectiveness of a representative sampling of zeolitic materials of the present invention at various concentrations of cracking catalysts. The results of hard slag material formation versus amounts of the various zeolitic materials were plotted and are presented in FIG. 2 hereof.

EXAMPLE 3

This example was run to test the effectiveness of the zeolitic materials of the present invention, as represented by an equilibrium catalytic cracking catalyst USY, for controlling slag formation under conditions which would be closer to commercial gasifier conditions. The test unit was comprised of a gas/water/(steam) feed section, a reactor section, and a product overhead section.

At the start of the run, 30 grams of coke (identical to that used in Example 1 hereof) was charged into the reactor which consisted of a fluid bed quartz/vycor reactor with a frit at the bottom to provide uniform gas distribution. The reactor was housed in a split shell furnace which was preheated to a temperature of 1750° F. Water was pumped to a steam generator and mixed with air. The steam generator was operated at a temperature of 150° F. At this operating temperature and assuming that air is saturated after passing through the steam generator, it can be estimated that the air used to combust/gasify coke contained about 20 wt. % steam. The air rate was controlled at 0.74 l/min. With the 1 inch diameter reactor used, the superficial gas velocity in the reactor was about 0.3 feet/second, which was sufficient for fluidizing the coke in the 1 inch reactor with minimal mass transfer limitations. The gas was passed through a frit which fluidized the coke bed. The steam and air reactor with the coke and form a product gas composed primarily of $H_2$, CO, $CO_2$, $CH_4$, $H_2S$, $H_2O$, and diluent $N_2$. There was disengaging volume in the top section of the reactor to reduce fine carryover into the overhead system.

Figure 3:
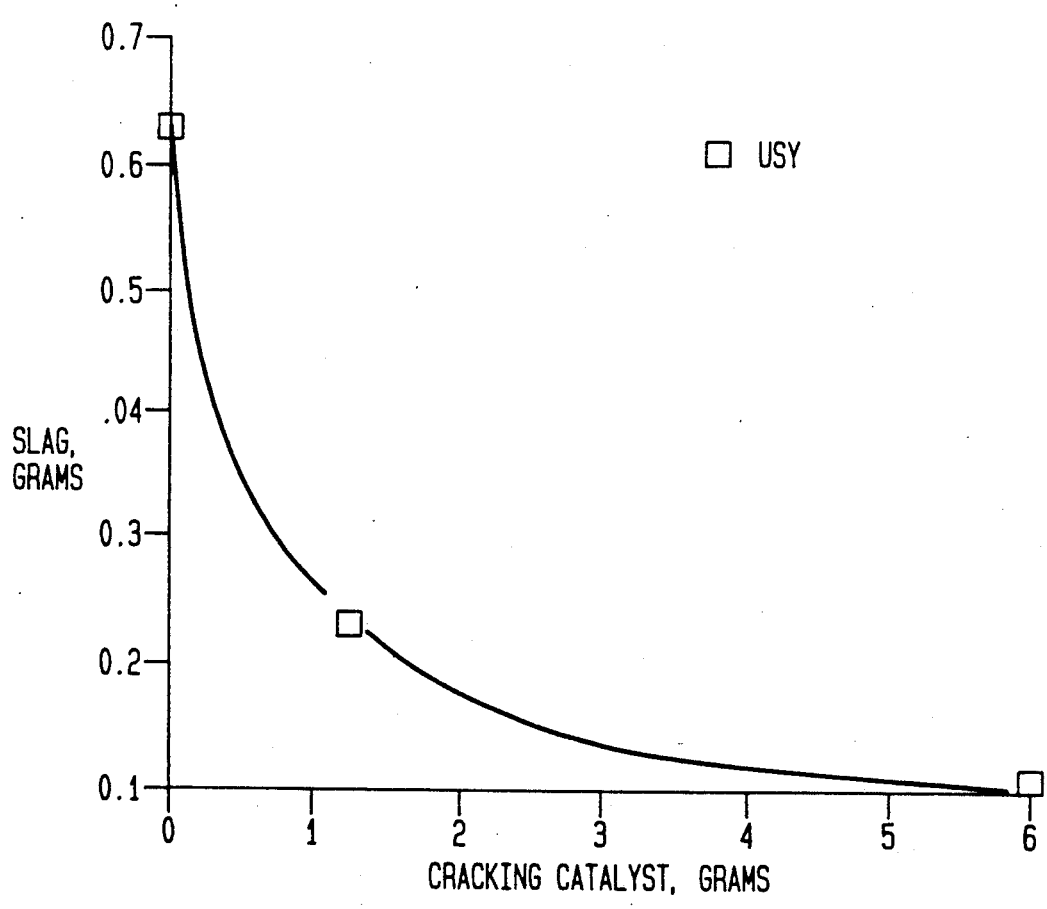
FIG. 3 is a graphical representation of slag reduction in a fluid bed process in accordance with Example 3 hereof.

The overhead gas proceeds to a cooler to condense the excess water in the gas and then to a filter to remove fines. After 4–6 hours of operations, most of the coke is gasified. Slag formed was quantified by weighing the reactor after the run and comparing it to the weight of the reactor prior to the run. The results were plotted and are illustrated in FIG. 3 hereof.

What is claimed is:

1. In a fluid coking-gasification process for converting heavy hydrocarbonaceous materials to lower boiling products, which process comprises:
   (a) introducing a heavy hydrocarbonaceous charges-tock into a coking zone comprised of a bed of fluidized solids maintained at fluid coking conditions, including a temperature from about 850° to 1200° F. and a total pressure of up to about 150 psig, to produce a vapor phase product including normally liquid hydrocarbons, and coke, the coke depositing on the fluidized solids;
(b) introducing a portion of said solids with coke deposited thereon into a heating zone comprised of a fluidized bed of solid particles and operated at a temperature greater than said coking zone; and
(c) recycling a portion of said heated solids from said heating zone to said coking zone;
(d) introducing a second portion of said heated solids from the heating zone to a gasification zone comprised of a fluidized bed of solid particles and maintained at a temperature greater than the heating zone; and
(e) reacting said second portion of heated solids in said gasification zone with steam and an oxygen-containing gas;
the improvement which comprises using an effective amount of a zeolitic material to prevent slagging in the gasifier, wherein the zeolitic material is introduced into the process by: (i) adding it directly into the gasification zone through the bottom of the gasifier; or (ii) mixing it with the portion of heated solids passing from the heating zone to the gasification zone.

2. The process of claim 1 wherein about 0.1 to about 20 wt. % zeolitic material is used based on the total weight of coke plus zeolitic material.

3. The process of claim 2 wherein about 1 to 7 wt. % zeolite material is used on the total weight of coke plus zeolitic material.

4. The process of claim 2 wherein the zeolitic material is a faujasite zeolite.

5. The process of claim 4 wherein the zeolitic material is USY.

6. The process of claim 2 wherein the zeolite is a rare earth exchanged zeolite Y.

7. The process of claim 6 wherein the rare earth is selected from La and Ce.

8. The process of claim 1 wherein the zeolite is NaY.

9. The process of claim 3 wherein the zeolite material is a faujasite type zeolite.

10. The process of claim 3 wherein the zeolite material is added directly into the gasification zone.

11. The process of claim 4 wherein the zeolite material is added directly into the gasification zone.

12. The process of claim 1 wherein the heating zone is operated at a temperature which is from about 100° to 400° F. higher than that of the coking zone.

13. The process of claim 1 wherein the gasification zone is operated at a temperature from about 1600° to 2000° F.

14. The process of claim 9 wherein the heating zone is operated at a temperature which is from about 100° to 400° F. higher than the coking zone.

15. The process of claim 14 wherein the gasification zone is operated at a temperature from about 1600° to 2000° F.

16. The process of claim 6 wherein the heating zone is operated at a temperature which is from about 100° to 400° F. higher than that of the coking zone and wherein the gasification zone is operated at a temperature from about 1600° to 2000° F.

* * * * *